(12) United States Patent
Huang et al.

(10) Patent No.: US 10,885,390 B2
(45) Date of Patent: Jan. 5, 2021

(54) SAMPLE SELECTION METHOD AND APPARATUS AND SERVER

(71) Applicants: Nanjing University of Aeronautics and Astronautics, Jiangsu (CN); Tencent Technology (Shenzhen) Company Limited, Shenzhen (CN)

(72) Inventors: Shengjun Huang, Shenzhen (CN); Nengneng Gao, Shenzhen (CN); Kun Yuan, Shenzhen (CN); Wei Chen, Shenzhen (CN); Di Wang, Shenzhen (CN)

(73) Assignees: NANJING UNIVERSITY OF AERONAUTICS AND ASTRONAUTICS, Jiangsu (CN); TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 76 days.

(21) Appl. No.: 16/353,754

(22) Filed: Mar. 14, 2019

(65) Prior Publication Data

US 2019/0213447 A1 Jul. 11, 2019

Related U.S. Application Data

(63) Continuation of application No. PCT/CN2018/075114, filed on Feb. 2, 2018.

(30) Foreign Application Priority Data

Feb. 8, 2017 (CN) .......................... 2017 1 0069595

(51) Int. Cl.
*G06K 9/62* (2006.01)
*G06N 20/00* (2019.01)
(Continued)

(52) U.S. Cl.
CPC ............. *G06K 9/6262* (2013.01); *G06K 9/62* (2013.01); *G06K 9/6215* (2013.01);
(Continued)

(58) Field of Classification Search
CPC ...... G06K 9/6262; G06K 9/62; G06K 9/6215; G06K 9/6256; G06K 9/6255; G06N 5/003; G06N 20/00; G06N 7/005; G06F 16/00
See application file for complete search history.

(56) References Cited

U.S. PATENT DOCUMENTS

| 8,682,065 B2 * | 3/2014 | Wang | G06K 9/6215 |
| | | | 382/165 |
| 8,706,729 B2 * | 4/2014 | Welinder | G06Q 10/101 |
| | | | 707/736 |

(Continued)

FOREIGN PATENT DOCUMENTS

| CN | 103049526 A | 4/2013 |
| CN | 105930873 A | 9/2016 |
| CN | 106095893 A | 11/2016 |

OTHER PUBLICATIONS

International Search Report and Written Opinion from corresponding international application No. PCT/CN2048/0175144, 10pgs., dated May 3, 2018.

*Primary Examiner* — Yon J Couso
(74) *Attorney, Agent, or Firm* — Brinks Gilson & Lione

(57) ABSTRACT

A sample selection method and apparatus and a server belong to the field of metric learning technologies. The method includes: selecting n sample pairs from an unlabeled sample set, each sample pair including two samples, and each sample including data in p modalities; calculating a partial similarity between data that is in each modality and that is of one sample included in the sample pair and data that is in each modality and that is of the other sample, to
(Continued)

obtain p×p partial similarities; calculating, according to the p×p partial similarities, an overall similarity between the two samples included in the sample pair; obtaining a degree of difference between the p×p partial similarities and the overall similarity; and selecting a sample pair that meets a preset condition and that is in the n sample pairs as a training sample. In this application, training samples of high quality are selected to train a metric model, so that the metric model of higher precision can be trained by using fewer training samples.

20 Claims, 6 Drawing Sheets

(51) Int. Cl.
*G06N 5/00* (2006.01)
*G06N 7/00* (2006.01)
*G06F 16/00* (2019.01)

(52) U.S. Cl.
CPC ........... *G06K 9/6256* (2013.01); *G06N 5/003* (2013.01); *G06N 20/00* (2019.01); *G06F 16/00* (2019.01); *G06N 7/005* (2013.01)

(56) References Cited

U.S. PATENT DOCUMENTS

| | | | | |
|---|---|---|---|---|
| 10,515,443 | B2* | 12/2019 | Shen | ........................ G06K 9/623 |
| 2010/0299144 | A1 | 11/2010 | Barzelay et al. | |
| 2014/0129489 | A1* | 5/2014 | Baker | .................... G06N 20/00 |
| | | | | 706/11 |
| 2016/0093048 | A1* | 3/2016 | Cheng | .................. G06K 9/6289 |
| | | | | 382/131 |

* cited by examiner

| | |
|---|---|
| Nanjing real estate market | Nanjing real estate market |
| Function introduction | Love real estate and reveal awesome news. There are original articles herein that you cannot see on newspapers and websites. There are inside stories of real estate that most people cannot touch. There are belles, comedies, hot comments, news flash, and the like. This is an official account that is elaborately maintained by a plurality of real estate people in Nanjing and that provides valuable information, viewpoints, and modes of thinking for people. Big shots are here waiting for you! |

Are the two official accounts are similar? Yes ✓  No ☐

| | |
|---|---|
| Real estate market of the area north of the Yangtze River | Real estate market of the area north of the Yangtze River |
| Function introduction | Most authoritative and most convenient information of the real estate market of the new district of the area north of the Yangtze River of Nanjing, and the first choice of platform for buying houses and selling houses in the area north of the Yangtze River |

FIG. 5

SAMPLE SELECTION METHOD AND APPARATUS AND SERVER

RELATED APPLICATION

This application is a continuation of International Application number PCT/CN2018/075114, filed Feb. 2, 2018 and claims priority to Chinese Patent Application No. 201710069595.X, entitled "SAMPLE SELECTION METHOD AND APPARATUS" and filed with the China National Intellectual Property Administration on Feb. 8, 2017, both of which applications are incorporated herein by reference in their entirety.

FIELD OF THE TECHNOLOGY

This application relates to the field of metric learning technologies, and in particular, to a sample selection method and apparatus and a server.

BACKGROUND OF THE DISCLOSURE

Metric learning means automatically learning, from a sample pair whose correlation is already labeled, a distance metric that properly describes a semantic similarity between two objects, and is a machine learning technology commonly used in the field of image retrieval.

Currently, some relatively mature technologies related to metric learning already exist. However, most of the technologies are for a correlation metric between single-modality data (for example, an image and an image), and are not applicable to a correlation metric between cross-modality data (for example, an image and text). In metric learning for the cross-modality data, in the existing technology, a training sample set is established in advance. The training sample set includes a large quantity of training samples. Each training sample includes a sample pair whose correlation is already labeled. Then the training sample set is used to train a metric model. The metric model is used for measuring a correlation between a set of cross-modality data. A manner of establishing the training sample set is usually selecting, in a manner of random sampling, a sample pair from an unlabeled sample set as training samples, and performing, by a labeling personnel, correlation labeling on the selected training samples.

In the existing technology, the training samples selected in the manner of random sampling have relatively low quality, resulting in relatively low accuracy of a final metric model obtained through training. In addition, a large quantity of training samples whose correlations are already labeled are required for training a metric model. Consequently, efficiency of training the model is relatively low. In addition, labeling of the training samples requires relatively much time and high costs.

SUMMARY

Embodiments of this application provide a sample selection method and apparatus and a server, to resolve problems that accuracy of a model is relatively low, efficiency of training the model is relatively low, and labeling of training samples requires relatively much time and high costs in the existing technology in the metric learning for cross-modality data. The technical solutions are as follows:

According to one aspect, a sample selection method is provided, applied to a server, and includes:

selecting n sample pairs from an unlabeled sample set, each sample pair including two samples, each sample including data in p modalities, n being a positive integer, and p being an integer greater than 1:

calculating a partial similarity between data that is in each modality and that is of one sample included in each of the n sample pairs and data that is in each modality and that is of the other sample, to obtain p×p partial similarities;

calculating, according to the p×p partial similarities, an overall similarity between the two samples included in the sample pair;

obtaining a degree of difference between the p×p partial similarities and the overall similarity; and selecting a training sample from a sample pair that meets a preset condition and that is in the n sample pairs, the preset condition satisfying that the degree of difference is greater than a first threshold and the overall similarity is less than a second threshold.

According to another aspect, a sample selection apparatus is provided, applied to a server, and includes:

a selection module, configured to select n sample pairs from an unlabeled sample set, each sample pair including two samples, each sample including data in p modalities, n being a positive integer, and p being an integer greater than 1;

a first calculation module, configured to calculate a partial similarity between data that is in each modality and that is of one sample included in each of the n sample pairs and data that is in each modality and that is of the other sample, to obtain p×p partial similarities;

a second calculation module, configured to calculate, according to the p×p partial similarities, an overall similarity between the two samples included in the sample pair;

a third calculation module, configured to obtain a degree of difference between the p×p partial similarities and the overall similarity; and a selection module, configured to select a training sample from a sample pair that meets a preset condition and that is in the n sample pairs, the preset condition satisfying that the degree of difference is greater than a first threshold and the overall similarity is less than a second threshold.

According to still another aspect, a server is provided, the server including a processor and a memory, the memory storing a computer program, the computer program being loaded and executed by the processor to implement the sample selection method according to the foregoing aspect.

According to yet another aspect, a computer readable storage medium is provided, the computer readable storage medium storing a computer program, the computer program being loaded and executed by a processor to implement the sample selection method according to the foregoing aspect.

According to still yet another aspect, a computer program product is provided, when executed, the computer program product being configured to perform the sample selection method according to the foregoing aspect.

Beneficial effects of the technical solutions provided in the embodiments of this application include:

An active learning technology is applied to the metric learning for the cross-modality data, and most valuable sample pairs are actively selected as training samples to significantly improve quality of the training samples. The most valuable sample pair is a sample pair having a positive effect on improving accuracy of the metric model, for example, a sample pair not learned and mastered by the metric model in a previous training process. The training samples selected in the embodiments of this application have higher quality than those selected in the existing technology. Therefore, the embodiments of this application have the following advantages: First, when equal quantities of training samples are selected, a metric model obtained through training of training samples selected by using the method provided in the embodiments of this application has higher accuracy. Second, to obtain metric models having equal precision, fewer training samples are required in the method provided in the embodiments of this application, thereby helping improve efficiency of training a model and reduce time and costs required for labeling training samples. Therefore, compared with the existing technology, in the technical solutions provided in the embodiments of this application, training samples of high quality are selected to train a metric model, so that the metric model of higher precision can be trained by using fewer training samples.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 5 is a schematic diagram of a labeling interface according to embodiments of this application;

DESCRIPTION OF EMBODIMENTS

To make the objectives, technical solutions, and advantages of this application clearer, the following further describes the implementations of this application in detail with reference to the accompanying drawings.

In embodiments of this application, an active learning technology is applied to metric learning for cross-modality data, and most valuable sample pairs are actively selected as training samples to perform correlation labeling and for model training, to significantly improve quality of the training samples, thereby achieving technical effects of improving accuracy of a final metric model obtained through training, improving efficiency of training the metric model, and reducing time and costs required for labeling the training samples. The following further describes the embodiments of this application in detail based on the foregoing common aspects in the embodiments of this application.

In the method provided in the embodiments of this application, steps may be performed by a server. For example, the server may be a server, a server cluster including a plurality of servers, or a cloud computing service center.

The technical solutions provided in the embodiments of this application may be applied to the field of cross-modality data retrieval, for example, the retrieval field of data crossing two modalities, to be specific, an image and text. By using the metric model provided in the embodiments of this application, a correlation between data in same modalities and a correlation between cross-modality data can be accurately calculated, to accurately feed back to-be-retrieved content to a user.

Figure 1:
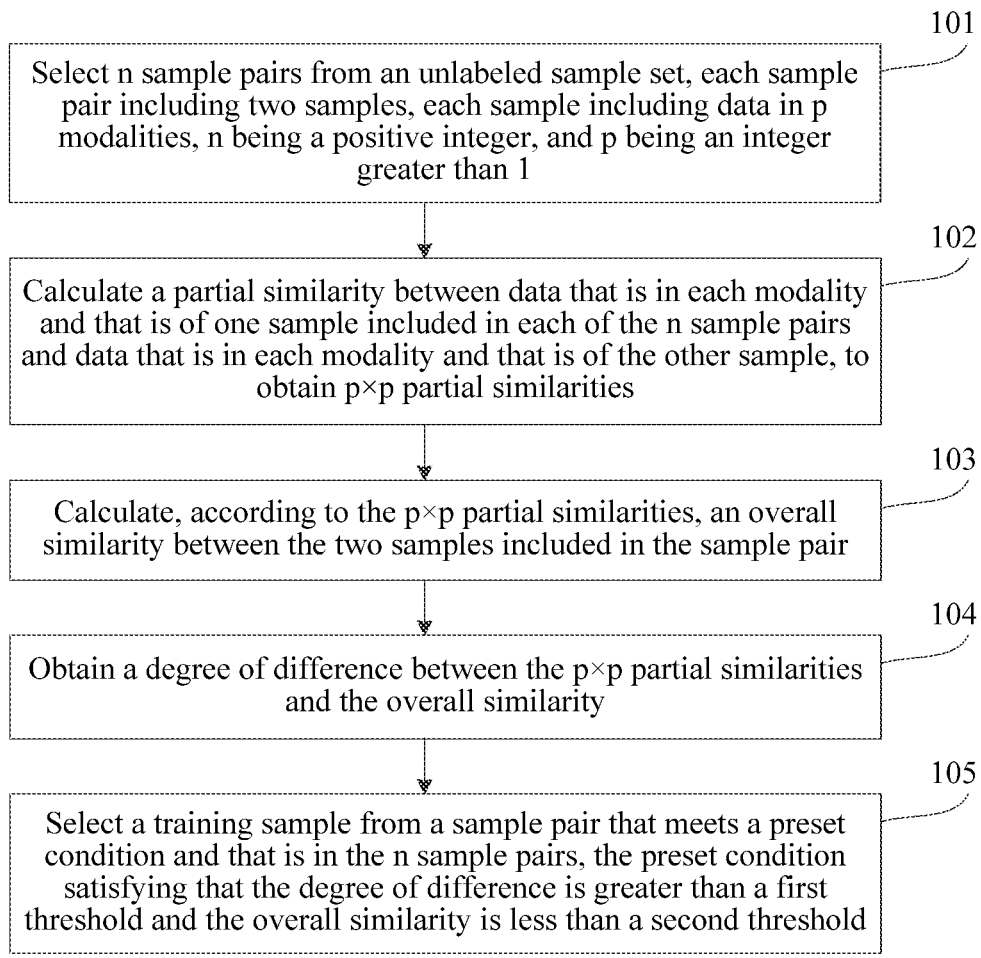
FIG. 1 is a flowchart of a sample selection method according to an embodiment of this application.

FIG. 1 is a flowchart of a sample selection method according to an embodiment of this application. The method may include the following steps:

Step 101: Select n sample pairs from an unlabeled sample set, each sample pair including two samples, each sample including data in p modalities, n being a positive integer, and p being an integer greater than 1.

The unlabeled sample set includes a plurality of samples, and each sample includes data in a plurality of modalities. There is a correlation between the data in the p modalities that is included in each sample. For example, each sample includes data in two modalities, to be specific, an image and text. The text is literal information for describing the image. For example, the text is used for describing content of the image.

In this embodiment of this application, a perspective from which modalities are classified is not limited. In an example, the modalities are classified from a perspective of data types. Data in different modalities may be data of different data types, for example, an image and text, an audio and text, a video and text, and an image and an audio. In another example, the modalities are classified from a perspective of data content. Data in different modalities may be data of different data content. For example, data related to a physical condition may be classified into a plurality of different modalities as follows: blood pressure data, blood glucose data, electrocardiogram data, weight data, and the like.

Optionally, the n sample pairs are selected from the unlabeled sample set in a manner of random sampling.

For example, the unlabeled sample set is represented by using a set U. The set U includes N1 samples. The n sample pairs are selected from the N1 samples in the manner of random sampling. The n sample pairs form a candidate training sample set. The candidate training sample set is represented by using a set P. For example, it is assumed that each sample includes data in two modalities, to be specific, an image and text.

Step 102: Calculate a partial similarity between data that is in each modality and that is of one sample included in each of the n sample pairs and data that is in each modality and that is of the other sample, to obtain p×p partial similarities.

For each sample pair, the calculated p×p partial similarities include p similarities between data in same modalities and p×p−p similarities between cross-modality data. The foregoing example is still used as an example. It is assumed that each sample includes data in two modalities, to be specific, an image and text. Four partial similarities can be calculated for each sample pair (including a first sample and a second sample). Two similarities between data in same modalities are respectively a similarity between an image of the first sample and an image of the second sample and a similarity between text of the first sample and text of the second sample. Another two similarities between cross-modality data are respectively a similarity between the image of the first sample and the text of the second sample and a similarity between the text of the first sample and the image of the second sample.

Optionally, step 102 includes the following substeps:

Step 102a: Extract a feature from data that is in each modality and that is of each sample included in each of the n sample pairs.

In actual application, for data in different modalities, the extracted features are different, may be preset according to an actual application requirement, and are not limited in this embodiment. For example, it is assumed that each sample includes data in two modalities, to be specific, an image and text, and therefore features extracted from the sample includes an image feature and a text feature. The image feature is extracted from the image included in the sample. The image feature may be extracted by using a classic method in a digital image processing textbook. The image feature includes, but is not limited to, at least one of a color feature, a texture feature, and a shape feature. The text feature is extracted from the text included in the sample. The text feature may be extracted by using a classic method in the field of natural language processing. The text feature includes, but is not limited to, a term frequency-inverse document frequency (TF-IDF) feature, a latent Dirichlet allocation (LDA) feature, a feature of part of speech, and the like.

For example, a sample is represented as O. An image feature extracted from the sample O is $x \in \mathbb{R}^{D_x}$, a text feature extracted from the sample O is $z \in \mathbb{R}^{D_z}$, and the sample O may be represented as O=[x; z] in a form of a feature vector. $D_x$ represents the quantity of dimensions of the image feature (namely, the quantity of terms), and $D_z$ represents the quantity of dimensions of the text feature (namely, the quantity of terms).

Step 102b: Calculate the p×p partial similarities according to a feature of the data that is in each modality and that is of one sample included in the sample pair and a feature of the data that is in each modality and that is of the other sample.

The p×p partial similarities are calculated by using a metric model already obtained through training according to the feature of the data that is in each modality and that is of one sample included in the sample pair and the feature of the data that is in each modality and that is of the other sample. The metric model already obtained through training is obtained through training by using an already established training sample set. The already established training sample set is represented as a set L and includes N2 training samples. Each training sample includes a sample pair whose correlation is already labeled. In this embodiment of this application, training samples of high quality are selected by using the method and the process provided in this embodiment, and the training samples of high quality are used to update the training sample set L. Then an updated training sample set L is used to train the metric model again, to optimize the metric model.

An initial metric model may be obtained through training by using an initial training sample set. The initial training sample set may include a small quantity of training samples. The small quantity of training samples may be selected from the unlabeled sample set in the manner of random sampling, and the selected training samples are used for training the initial metric model after correlation is labeled on the selected training samples by a labeling personnel. In this embodiment, a metric model is represented as M. The metric model M is a matrix having k rows and k columns, k represents a sum of the quantities of dimensions (namely, the quantities of terms) of features of data in p modalities that is included in a sample, k is an integer greater than 1. For example, it is assumed that each sample includes data in two modalities, to be specific, an image and text. The image feature extracted from the sample O is $x \in \mathbb{R}^{D_x}$, the text feature extracted from the sample O is $z \in \mathbb{R}^{D_z}$, and the metric model M is a matrix having $(D_x + D_z)$ rows and $(D_x + D_z)$ columns. The metric model M may be regarded to include p×p metric sub-models. Each metric sub-model is used for calculating a partial similarity according to a feature of data that is in a modality and that is of one object and a feature of data that is in a modality and that is of the other object. The metric model M is used for calculating an overall similarity between two objects according to the p×p partial similarities. The foregoing object may be a sample in a training sample, or may be data input when the metric model is used to perform correlation metric.

For example, it is assumed that p is 2, and each sample includes data in two modalities, to be specific, an image and text. The image feature extracted from the sample O is $x \in \mathbb{R}^{D_x}$, the text feature extracted from the sample O is $z \in \mathbb{R}^{D_z}$, and the metric model M may be represented as:

$$M = \begin{pmatrix} M_{11} & M_{12} \\ M_{12}^T & M_{22} \end{pmatrix}.$$

The metric model M may be regarded to include four metric sub-models, to be specific, M11, M12, M21 (namely, $M_{12}^T$), and M22. The metric sub-model M11 is a matrix having $D_x$ rows and $D_x$ columns, and is used for calculating a similarity between images of the two objects according to an image feature of one object and an image feature of the other object. The metric sub-model M12 is a matrix having $D_x$ rows and $D_z$ columns, and is used for calculating a similarity between an image of one object and text of the other object according to the image feature of one object and a text feature of the other object. The metric sub-model M21 is a matrix having $D_z$ rows and $D_x$ columns, and is used for calculating a similarity between text of one object and an image of the other object according to a text feature of one object and the image feature of the other object. The metric sub-model M22 is a matrix having $D_z$ rows and $D_z$ columns, and is used for calculating a similarity between text of the two objects according to the text feature of one object and the text feature of the other object. Four partial similarities that are respectively represented as $S_{M_{11}}$, $S_{M_{22}}$, $S_{M_{12}}$, and $S_{M_{21}}$ can be calculated by using the metric model M.

Step 103: Calculate, according to the p×p partial similarities, an overall similarity between the two samples included in the sample pair.

Optionally, the p×p partial similarities are added to obtain the overall similarity. In this embodiment, the overall similarity is represented as $S_M$.

Using an example in which an overall similarity $S_M(o_i, o_j)$ between two samples $o_i$ and $o_j$ included in a sample pair ($o_i$, $o_j$) is calculated, a calculation process is as follows.

$$\begin{aligned} S_M(o_i, o_j) &= o_i^T M o_j \\ &= [x_i^T \, z_i^T] \begin{pmatrix} M_{11} & M_{12} \\ M_{12}^T & M_{22} \end{pmatrix} \begin{bmatrix} x_j \\ z_j \end{bmatrix} \\ &= [x_i^T \, z_i^T] \begin{pmatrix} w_x w_x^T & w_x w_z^T \\ w_z w_x^T & w_z w_z^T \end{pmatrix} \begin{bmatrix} x_j \\ z_j \end{bmatrix} \end{aligned}$$

-continued $$= x_i^T w_x w_x^T x_j + z_i^T w_z w_x^T x_j x_i^T w_x w_z^T z_j + z_i^T w_z w_z^T z_j$$

$$= x_i^T M_{11} x_j + z_i^T M_{21} x_j x_i^T M_{12} z_j + z_i^T M_{22} z_j$$

$$= S_{M_{11}} + S_{M_{21}} + S_{M_{12}} + S_{M_{22}}.$$

$x_i$ represents an image feature of the sample $o_i$. $z_i$ represents a text feature of the sample $o_i$. $x_j$ represents an image feature of the sample $o_j$. $z_j$ represents a text feature of the sample $o_j$.

In addition, an overall similarity between two samples included in a sample pair is calculated according to the p×p partial similarities by still using the metric model M already obtained through training.

Step 104: Obtain a degree of difference between the p×p partial similarities and the overall similarity.

The degree of difference may be measured by using a plurality of standards such as variance and residual.

Optionally, when variance is used to measure the degree of difference, a degree of difference $\text{var}(o_i, o_j)$ corresponding to the sample pair $(o_i, o_j)$ is:

$$\text{var}(o_i, o_j) = \left(S_{M_{11}} - \frac{S_M}{4}\right)^2 + \left(S_{M_{12}} - \frac{S_M}{4}\right)^2 + \left(S_{M_{21}} - \frac{S_M}{4}\right)^2 + \left(S_{M_{22}} - \frac{S_M}{4}\right)^2.$$

$S_M$ represents the overall similarity between the two samples $o_i$ and $o_j$ included in the sample pair $(o_i, o_j)$, namely $S_M(o_i, o_j)$, $S_M$ for short herein. $S_{M_{11}}$, $S_{M_{22}}$, $S_{M_{11}}$, and $S_{M_{21}}$ respectively represent partial similarities between the two samples $o_i$ and $o_j$ included in the sample pair $(o_i, o_j)$, namely, $S_{M_{11}}(o_i, o_j)$, $S_{M_{22}}(o_i, o_j)$, $S_{M_{12}}(o_i, o_j)$, and $S_{M_{21}}(o_i, o_j)$, $S_{M_{11}}$, $S_{M_{22}}$, $S_{M_{12}}$, and $S_{M_{21}}$ for short herein. The degree of difference $\text{var}(o_i, o_j)$ considers both partial similarities between data in same modalities and partial similarities between cross-modality data, and reflects a degree of inconsistence between the partial similarities and an overall similarity.

Step 105: Select a training sample from a sample pair that meets a preset condition and that is in the n sample pairs, the preset condition satisfying that the degree of difference is greater than a first threshold and the overall similarity is less than a second threshold.

After the overall similarity and the degree of difference corresponding to each sample pair are calculated, a most valuable sample pair is accordingly selected as the training sample. The most valuable sample pair is a sample pair having a positive effect on improving accuracy of a metric model, for example, a sample pair not learned and mastered by the metric model in a previous training process.

In this embodiment of this application, a sample pair of a relatively large degree of difference and a relatively small overall similarity is selected as a training sample, so that training samples of high quality are selected.

In an example, step 105 includes selecting, from the n sample pairs, a sample pair whose degree of difference is greater than the first threshold and whose overall similarity is less than the second threshold as the training sample. A value of the first threshold may be preset according to an actual requirement. A larger degree of difference corresponding to a to-be-selected sample pair indicates a larger value of the first threshold. A value of the second threshold may be preset according to an actual requirement. A smaller overall similarity corresponding to the to-be-selected sample pair indicates a smaller value of the second threshold.

In another example, step 105 includes the following substeps:

Step 105a: Calculate, according to the overall similarity and the degree of difference that correspond to each of the n sample pairs, an information amount corresponding to the sample pair.

An information amount $\text{dis}(o_i, o_j)$ corresponding to the sample pair $(o_i, o_j)$ is:

$$\text{dis}(o_i, o_j) = \frac{\text{var}(o_i, o_j)}{|S_M(o_i, o_j)|}.$$

Step 105b: Select, from the n sample pairs, a sample pair whose information amount is greater than a third threshold as the training sample.

A value of the third threshold may be preset according to an actual requirement. A larger degree of difference and a smaller overall similarity corresponding to the to-be-selected sample pair indicate a larger value of the third threshold.

In another possible implementation, after the information amount corresponding to each sample pair is calculated, the n sample pairs are sorted in descending order of information amounts to obtain a sample pair sequence. First m sample pairs are selected from the sample pair sequence as training samples. m is a positive integer. A value of m may be preset according to the quantity of training samples that need to be actually selected.

An information amount corresponding to a sample pair is calculated to maximize a degree of difference corresponding to the sample pair and minimize an overall similarity corresponding to the sample pair, thereby selecting a sample pair that meets the preset condition as the training sample.

In conclusion, in the method provided in this embodiment, an active learning technology is applied to metric learning for cross-modality data, and most valuable sample pairs are actively selected as training samples to significantly improve quality of the training samples. The training samples selected in the embodiments of this application have higher quality than those selected in the existing technology. Therefore, the embodiments of this application have the following advantages: First, when equal quantities of training samples are selected, a metric model obtained through training of training samples selected by using the method provided in the embodiments of this application has higher accuracy. Second, to obtain metric models having equal precision, fewer training samples are required in the method provided in the embodiments of this application, thereby helping improve efficiency of training a model and reduce time and costs required for labeling training samples. Therefore, compared with the existing technology, in the technical solutions provided in the embodiments of this application, training samples of high quality are selected to train a metric model, so that the metric model of higher precision can be trained by using fewer training samples.

Figure 2:
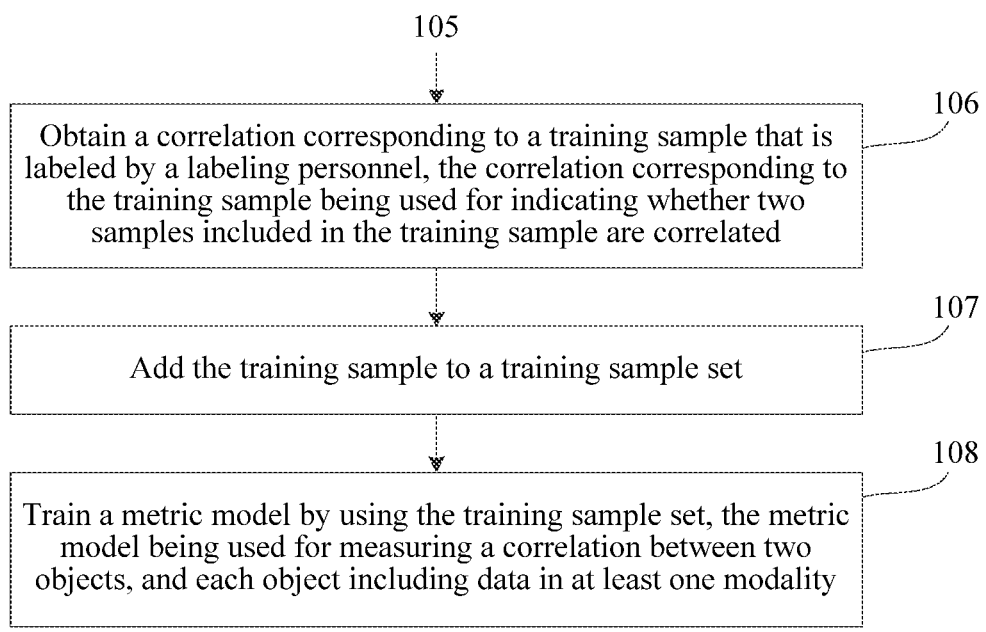
FIG. 2 is a flowchart of a sample selection method according to another embodiment of this application.

In an optional embodiment provided based on the embodiment shown in FIG. 1, as shown in FIG. 2, after step 105, the following steps are further included.

Step 106: Obtain a correlation corresponding to the training sample that is labeled by a labeling personnel, the correlation corresponding to the training sample being used for indicating whether two samples included in the training sample are correlated.

After the training samples of high quality are screened by using the embodiment shown in FIG. 1, the labeling personnel needs to perform correlation labeling on the training samples. That is, the labeling personnel determines whether the two samples included in the training sample are correlated, and labels a determining result. The labeling personnel may be considered to be an expert. A correlation labeled by the labeling personnel has relatively high accuracy and authority.

Optionally, it is assumed that training samples selected from the n sample pairs form a to-be-labeled training sample set. The to-be-labeled training sample set is represented as a set Q. Each training sample in the set Q is provided for the labeling personnel to perform correlation labeling.

For example, a server sends the to-be-labeled training sample set Q to user equipment corresponding to the labeling personnel. After receiving the to-be-labeled training sample set Q, the user equipment displays the training samples, obtains correlations corresponding to the training samples that are labeled by the labeling personnel, and sends the correlations to the server.

Step 107: Add the training sample to a training sample set.

After correlation labeling is completed, the training samples whose correlations are labeled are added to the training sample set L, to update the training sample set L.

Step 108: Train a metric model by using the training sample set, the metric model being used for measuring a correlation between two objects, and each object including data in at least one modality.

The updated training sample set L is used to training the metric model M again, to optimize accuracy of the metric model M.

During actual implementation, the metric model may be trained again for a plurality of times, to finally obtain a metric model of high precision. A small quantity of training samples of high quality are selected from an unlabeled sample set by using the metric model already obtained through training. A metric model of higher precision is obtained though training again in combination of existing training samples and the newly selected training samples. Then, a small quantity of training samples of high quality are selected from the unlabeled sample set again by using the metric model obtained through training again. A metric model of higher precision is obtained though training again in combination of existing training samples and the newly selected training samples. This cycle repeats until accuracy of a metric model obtained through training again reaches a requirement.

Figure 3:
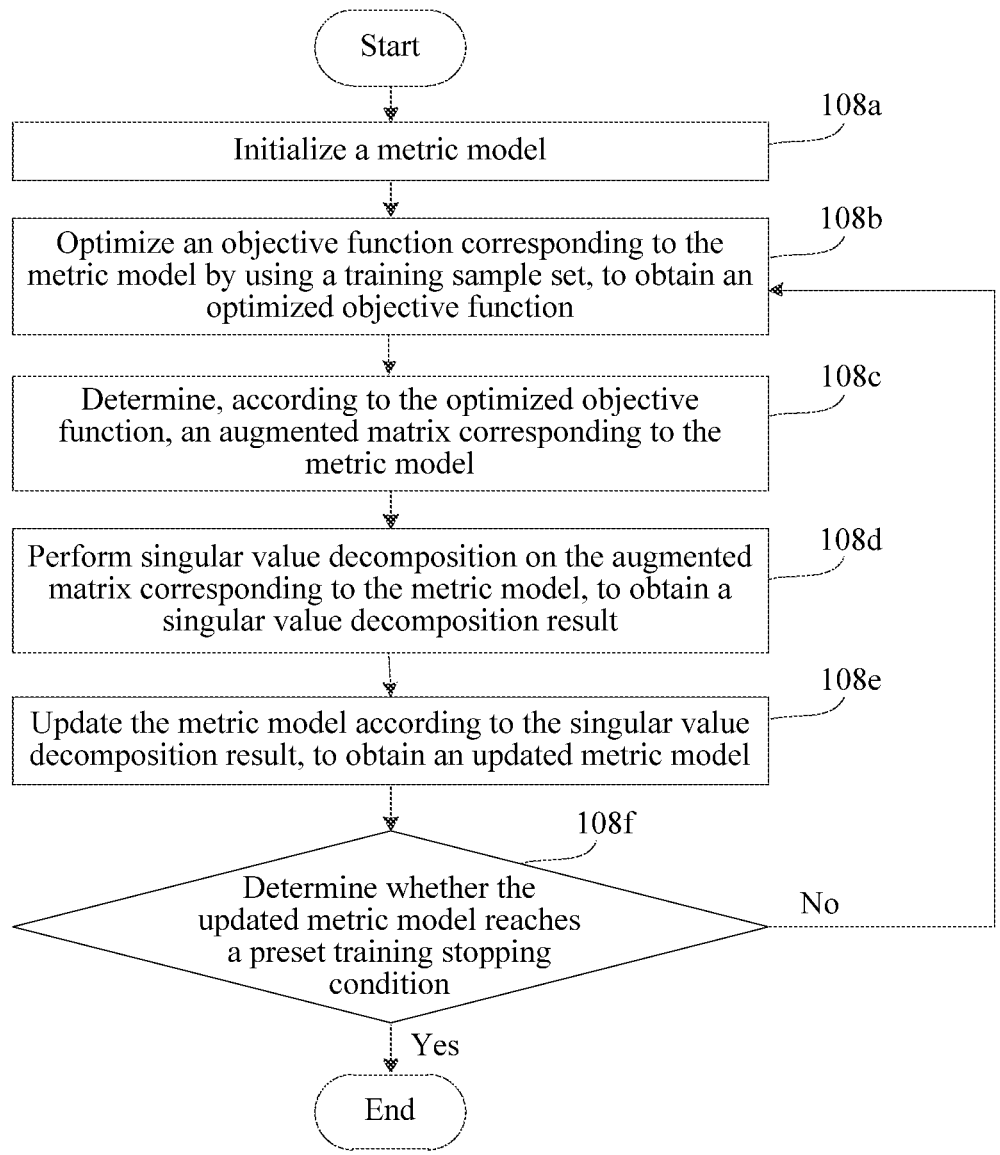
FIG. 3 is a flowchart of a model training process according to an embodiment of this application.

Optionally, as shown in FIG. 3, step 108 includes the following substeps:

Step 108a: Initialize the metric model.

It is already described above that the metric model M is the matrix having the k rows and the k columns. k represents the sum of the quantities of dimensions (namely, the quantities of terms) of the features of the data m the p modalities that is included in one sample. k is an integer greater than 1. Optionally, the metric model M is initialized into a unit matrix.

Optionally, in this embodiment, to optimize an objective function corresponding to the metric model M by using an accelerated proximal gradient (APG) method, a searching sequence Q corresponding to the metric model M further needs to be initialized. The searching sequence Q is a temporary variable of the metric model M in a process of optimizing the objective function. The searching sequence Q is used for recording a suboptimal solution of the metric model M. An optimal solution of the metric model M can be calculated according to the searching sequence Q. The searching sequence Q is also a matrix having k rows and k columns. In this embodiment, optimizing the objective function by using the APG method can accelerate an optimization process of the objective function.

Optionally, the metric model M is initialized into the unit matrix, and the searching sequence Q is initialized into a matrix whose elements are all zero.

For example, it is assumed that each sample includes data in two modalities, to be specific, an image and text. The image feature extracted from the sample O is $x \in \mathbb{R}^{D_x}$, the text feature extracted from the sample O is $z \in \mathbb{R}^{D_z}$, and the metric model M and the searching sequence Q are each a matrix in a size of $(D_x+D_z) \times (D_x+D_z)$.

In addition, the following processing may be performed on the training sample set L.

If a correlation labeled on the training sample (namely, the sample pair $(o_i, o_j)$ is correlated, the sample pair $(o_i, o_j)$ is added to a set S, and a value of a correlation $y_{ij}$ of the sample pair $(o_i, o_j)$ is +1; or if a correlation labeled on the sample pair $(o_i, o_j)$ is uncorrelated, the sample pair $(o_i, o_j)$ is added to a set D, and a value of a correlation $y_{ij}$ of the sample pair $(o_i, o_j)$ is −1. The correlation $y_{ij}$ is represented as the following formula:

$$y_{ij} = \begin{cases} +1, & (o_i, o_j) \in S \\ -1, & (o_i, o_j) \in D \end{cases}.$$

Step 108b: Optimize an objective function corresponding to the metric model by using the training sample set, to obtain an optimized objective function.

Optionally, the objective function is $$\min_M \sum_{i,j=1}^{m,n} w_{ij} \log(1 + \exp(-y_{ij} S_M(o_i, o_j))) + \lambda \|M\|_*.$$

$w_{ij}$ represents a weight corresponding to the sample pair $(o_i, o_j)$, $y_{ij}$ represents a correlation corresponding to the sample pair $(o_i, o_j)$, and $S_M(o_i, o_j)$ represents an overall similarity corresponding to the sample pair $(o_i, o_j)$. In this embodiment of this application, the overall similarity between the sample pair $(o_i, o_j)$ is calculated by using a bilinear similarity metric function in the following form: $S_M(o_i, o_j) = o_i^T M o_j$.

Optionally, to facilitate calculation, a weight $w_{ij}$ corresponding to the sample pair $(o_i, o_j)$ whose correlation is labeled to be correlated is set to $$\frac{1}{|S|},$$

and a weight $w_{ij}$ corresponding to the sample pair $(o_i, o_j)$ whose correlation is labeled to be uncorrelated is set to $$\frac{1}{|D|}.$$

A sign |·| represents the quantity of elements in a set. To be specific, |S| represents the quantity of elements in the set S, and |D| represents the quantity of elements in the set D.

In addition, $\|M\|_*$ represents a nuclear norm of a matrix M. In this embodiment, regularization of applying the nuclear norm to the matrix M is to learn a relation between data in different modalities.

The objective function may be abbreviated as $$\min_M l(M) + \lambda \|M\|_*,$$

where $$l(M) = \sum_{i,j=1}^{m,n} w_{ij} \log(1 + \exp(-y_{ij} S_M(o_i, o_j))).$$

In this embodiment, the APG method is used to optimize the objective function. An optimized objective function is:

$$\min_M l(Q_t) + \langle l'(Q_t), M - Q_t \rangle + \frac{1}{2\eta_t} \|M - Q_t\|_2^2 + \lambda \|M\|_*.$$

$l'(Q_t)$ is a first order derivative of the function $l(M)$ about $Q_t$.

It should be noted that in this embodiment, only an example in which the APG method is used to optimize the objective function is used. Other methods for optimizing the objective function are not limited in this embodiment.

Step 108c: Determine, according to the optimized objective function, an augmented matrix corresponding to the metric model.

The following may be obtained after the optimized objective function is sorted out:

$$\min_M \frac{1}{2} \|M - \tilde{M}_t\|_F^2 + \lambda \|M\|_*.$$

$\tilde{M}_t$ represents the augmented matrix of the metric model M, and $\tilde{M}_t = Q_t - \eta_t l'(Q_t)$.

Step 108d. Perform singular value decomposition on the augmented matrix corresponding to the metric model, to obtain a singular value decomposition result.

Singular value decomposition is performed on $\tilde{M}_t$, to obtain the singular value decomposition result: $\tilde{M}_t = U\Sigma V^T$.

U is a unitary matrix of an order $(D_x+D_z) \times (D_x+D_z)$; $\Sigma$ is a semi-definite diagonal matrix of the order $(D_x+D_z) \times (D_x-D_z)$; and $V^T$ is a conjugate transpose of V, and is a unitary matrix of the order $(D_x+D_z) \times (D_x+D_z)$. A diagonal element of $\Sigma$ is represented as $\Sigma_{ii}$, i being an $i^{th}$ singular value of $\tilde{M}_t$.

Step 108e: Update the metric model according to the singular value decomposition result, to obtain an updated metric model.

Optionally, the metric model M and the searching sequence Q are updated according to the following formula:

$$M_{t+1} = U \sum_{\lambda \eta_t} V^T, \lambda \eta_t = \max\left\{0, \sum_{ii} -\lambda \eta_t\right\}; \text{ and}$$

$$Q_{t+1} = M_{t+1} + \frac{\alpha_t - 1}{\alpha_{t+1}}(M_{t+1} - M_t),$$

where $\alpha_{t+1} = (1 + \sqrt{1 + 4\alpha_t^2})/2$, $\alpha_1 = 1$, $M_t$ represents the metric model M before the update, $M_{t+1}$ represents the metric model M after the update, $Q_t$ represents the searching sequence Q before the update, and $Q_{t+1}$ represents the searching sequence Q after the update. If in the following step 108f, the updated metric model is determined to not reach a preset training stopping condition, next round of training needs to be repeated. In the next round of training, the augmented matrix of the metric model is calculated by using the updated searching sequence Q.

Step 108f: Determine whether the updated metric model reaches a preset training stopping condition, if not, perform the process again from step 108b; or if yes, end the process.

The preset training stopping condition includes at least one of the following: the quantity of iterations reaches a preset value, and the metric model M does not change again. The foregoing preset value may be preset after overall consideration of training precision and a training speed of the model. If a requirement on the training precision of the model is higher, a larger value may be taken. If a requirement on the training speed of the model is higher, a smaller value may be taken.

By using the method provided in this embodiment, the metric model is trained again by using the updated training sample set, so that accuracy of the metric model is optimized.

Figure 4:
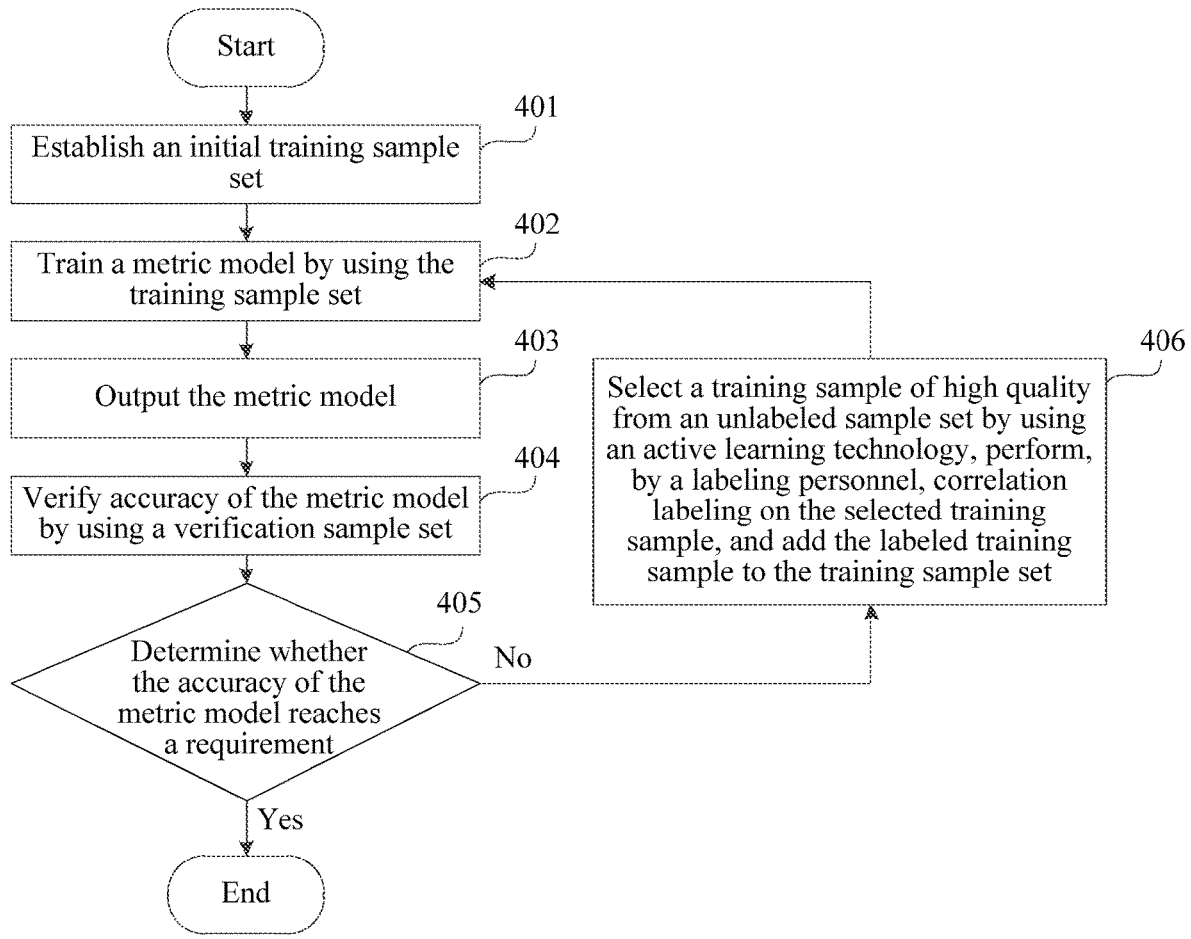
FIG. 4 is a flowchart of a model optimization process according to an embodiment of this application.

FIG. 4 is a flowchart of a model optimization process according to an embodiment of this application. The model optimization process includes the following steps:

Step 401: Establish an initial training sample set.

The initial training sample set may include a small quantity of training samples. The small quantity of training samples may be selected from an unlabeled sample set in a manner of random sampling, and the selected training samples are used for training an initial metric model after correlation is labeled on the selected training samples by a labeling personnel.

Step 402: Train a metric model by using the training sample set.

For a training process of the model, reference is made to descriptions in the embodiment shown in FIG. 3, and details are not described herein again.

Step 403: Output the metric model.

Step 404: Verify accuracy of the metric model by using a verification sample set.

The verification sample set includes at least one verification sample. Each verification sample includes a sample pair whose correlation is already labeled. The verification sample is input into the metric model, the metric model is used to predict a correlation between the sample pair included in the verification sample, and the predicted correlation is compared with the labeled correlation, so that whether a prediction result is accurate can be determined. In actual application, prediction results corresponding to a plurality of verification samples may be comprehensively considered, to obtain accuracy of the metric model. For example, the accuracy of the metric model=the quantity of verification samples whose prediction results are correct/the total number of verification samples.

Step 405: Determine whether the accuracy of the metric model reaches a requirement, if yes, end the process; or if not, perform the following step 406.

Optionally, whether the accuracy of the metric model is greater than or equal to a preset accuracy threshold is determined. If the accuracy of the metric model is greater than or equal to the preset accuracy threshold, it is determined that the accuracy of the metric model reaches the requirement. If the accuracy of the metric model is less than the preset accuracy threshold, it is determined that the accuracy of the metric model does not reach the requirement. The accuracy threshold may be preset according to a requirement on the precision of the metric model. A higher precision requirement indicates a larger specified accuracy threshold.

Step 406; Select a training sample of high quality from an unlabeled sample set by using an active learning technology, and perform, by a labeling personnel, correlation labeling on the selected training sample, and add the labeled training sample to the training sample set. After step 406, the steps are performed from step 402 again.

For a selection process of the training sample, reference may be made to descriptions in the embodiment of FIG. 1. For a labeling process of the training sample, reference may be made to descriptions in the embodiment of FIG. 2.

Figure 6:
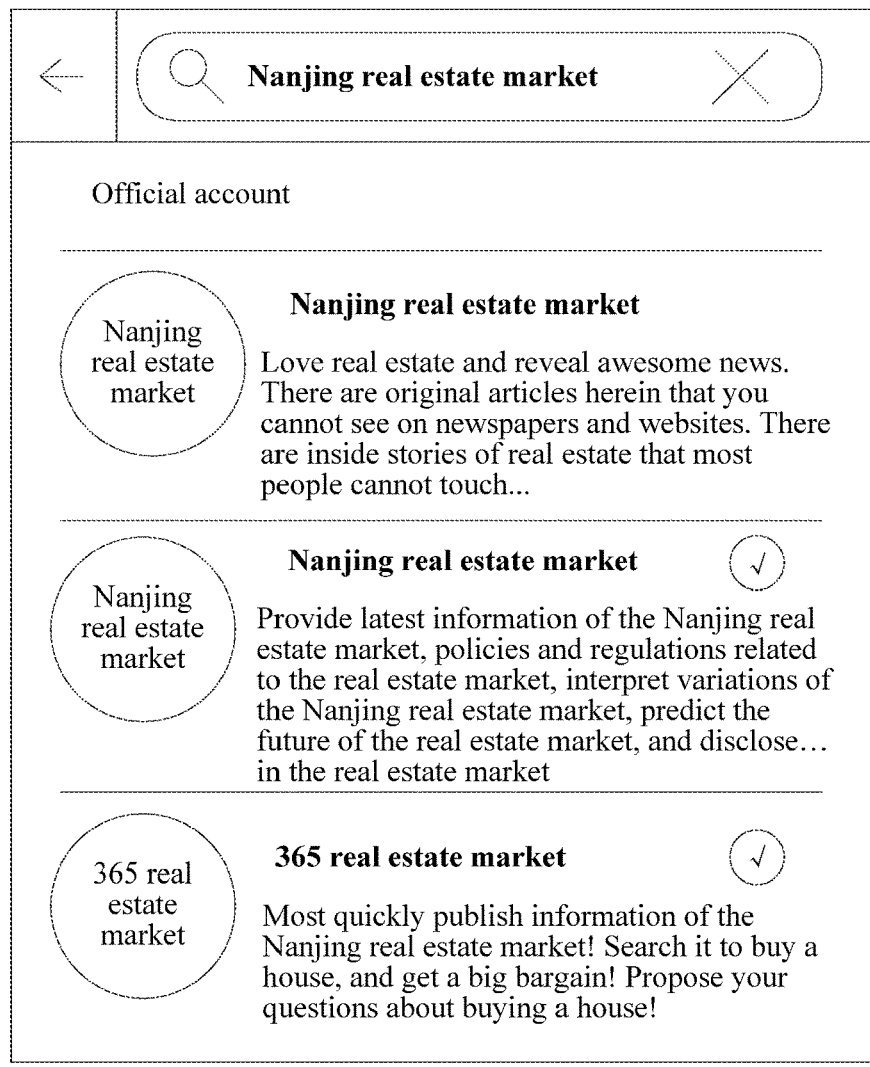
FIG. 6 is a schematic diagram of a retrieval interface according to embodiments of this application.

The technical solutions provided in the embodiments of this application may be applied to the field of cross-modality data retrieval, for example, the retrieval field of data crossing two modalities, to be specific, an image and text. Most valuable sample pairs are selected by using the active learning technology as training samples, and a professional labeling personnel performs correlation labeling on the training samples, so that labeling costs can be reduced, and an accurate metric model can be obtained through efficient training. For example, official account searching is used as an example. Related information of an official account generally includes data crossing two modalities, to be specific, an image (for example, an icon of the official account) and text (for example, brief introduction of the official account). It is assumed that a current training sample set already includes a small quantity of training samples. The small quantity of training samples are used to obtain an initial metric model through training. Training samples (for example, official accounts, to be specific, the Nanjing real estate market and the real estate market of the area north of the Yangtze River) of high quality are selected from an unlabeled sample set by using the active learning technology. A labeling personnel performs correlation labeling on the training samples. For corresponding labeling interfaces, for example, reference may be made to FIG. 5. The training samples whose correlations are already labeled are added to the training sample set. An updated training sample set is used to train the metric model again. If accuracy of the metric model obtained through training does not reach a requirement, training samples continue to be selected to update the training sample set, and the metric model is trained again. If the accuracy of the metric model obtained through training reaches the requirement, it indicates that an accurate metric model is already obtained. Then, the metric model is used to retrieve, according to retrieval information entered by a user, an official account related to the retrieval information. For a retrieval interface, for example, reference may be made to FIG. 6.

The following is an apparatus embodiment of this application, which can be used to execute the method embodiments of this application. For details not disclosed in the apparatus embodiment of this application, refer to the method embodiments of this application.

Figure 7:
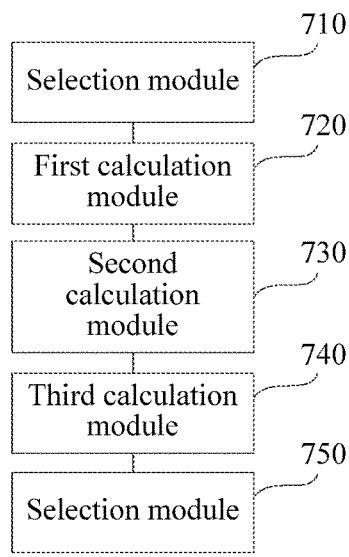
FIG. 7 is a block diagram of a sample selection apparatus according to an embodiment of this application.

FIG. 7 is a block diagram of a sample selection apparatus according to an embodiment of this application. The apparatus has functions of implementing the foregoing method examples. The functions may be implemented by using hardware, or may be implemented by hardware executing corresponding software. The apparatus may include: a selection module 710, a first calculation module 720, a second calculation module 730, a third calculation module 740, and a selection module 750.

The selection module 710 is configured to perform the foregoing step 101.

The first calculation module 720 is configured to perform the foregoing step 102.

The second calculation module 730 is configured to perform the foregoing step 103.

The third calculation module 740 is configured to perform the foregoing step 104.

The selection module 750 is configured to perform the foregoing step 105.

Optionally, the selection module 750 includes a calculation unit and a selection unit. The calculation unit is configured to perform the foregoing step 105*a*. The selection unit is configured to perform the foregoing step 105*b*.

Optionally, the first calculation module 720 includes an extraction unit and a calculation unit. The extraction unit is configured to perform the foregoing step 102*a*. The calculation unit is configured to perform the foregoing step 102*b*.

Optionally, the apparatus further includes an obtaining module, an addition module, and a training module. The obtaining module is configured to perform the foregoing step 106. The addition module is configured to perform the foregoing step 107. The training module is configured to perform the foregoing step 108.

Optionally, the training module includes an initialization unit, an optimization unit, a determining unit, a decomposition unit, an update unit, and a judging unit. The initialization unit is configured to perform the foregoing step 108*a*. The optimization unit is configured to perform the foregoing step 108*b*. The determining unit is configured to perform the foregoing step 108*c*. The decomposition unit is configured to perform the foregoing step 108*d*. The update unit is configured to perform the foregoing step 108*e*. The judging unit is configured to perform the foregoing step 108*f*.

For related details, reference may be made to the foregoing method embodiments.

It should be noted that: when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to one conception. For the specific implementation process, refer to the method embodiments, and details are not described herein again.

Figure 8:
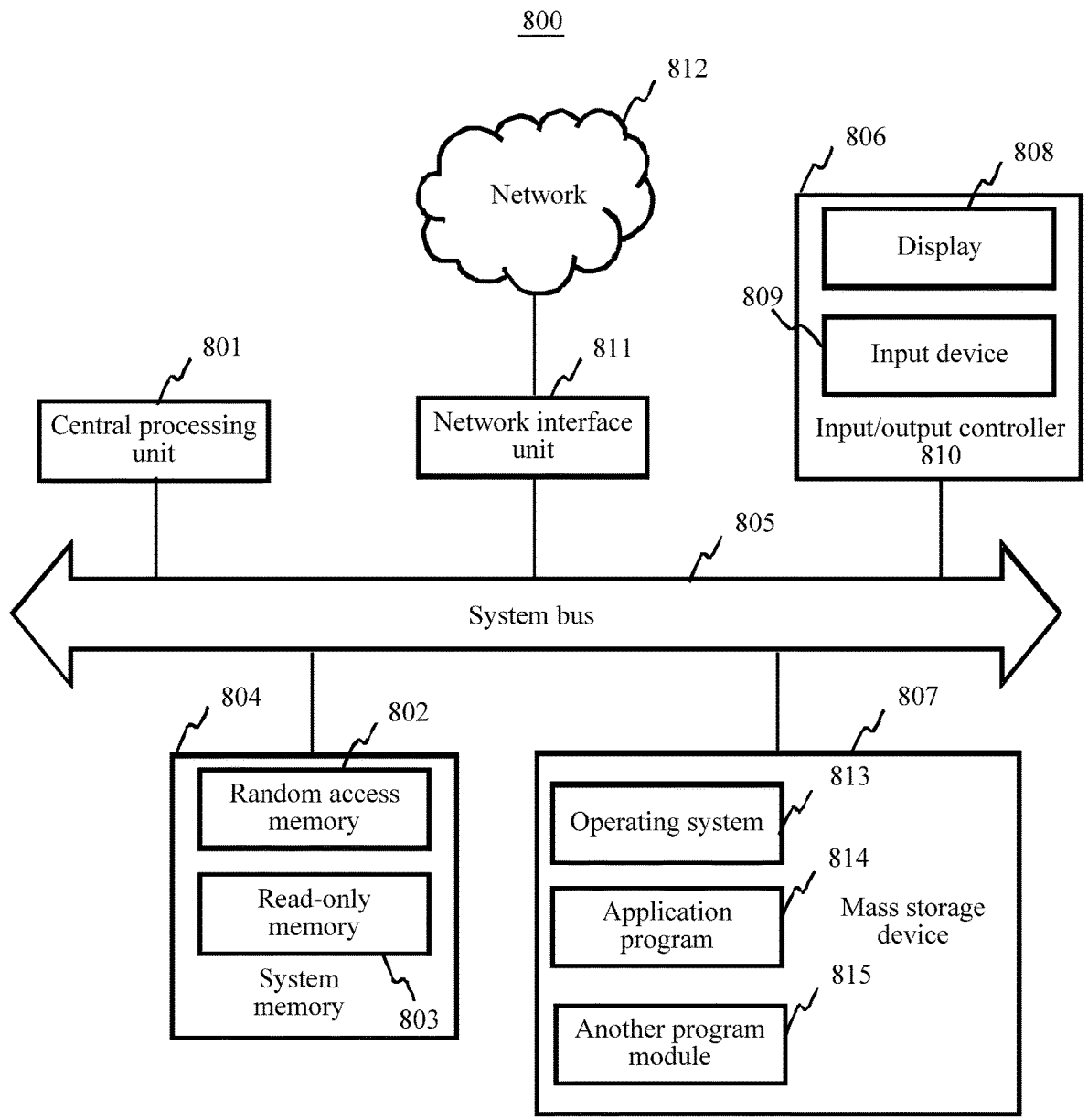
FIG. 8 is a schematic structural diagram of a server according to an embodiment of this application.

FIG. 8 is a schematic structural diagram of a server according to an embodiment of this application. The server is configured to implement the method provided in the foregoing embodiments. Specifically:

A server 800 includes a central processing unit (CPU) 801, a system memory 804 including a random access memory (RAM) 802 and a read-only memory (ROM) 803, and a system bus 805 connecting the system memory 804 and the CPU 801. The server 800 further includes a basic input/output system (I/O system) 806 helping transmit information between components in a computer, and a mass storage device 807 used for storing an operating system 813, an application program 814, and another program module 815.

The basic I/O system 806 includes a display 808 used for displaying information, and an input device 809, such as a mouse and a keyboard, used for a user to input information. The display 808 and the input device 809 are connected to an input/output controller 810 of the system bus 805, to be connected to the CPU 801. The basic I/O system 806 may further include the input/output controller 810, to receive and process input of a plurality of other devices, such as the keyboard, the mouse, or an electronic stylus. Similarly, the input and output controller 810 further provides an output to a display screen, a printer or another type of output device.

The mass storage device 807 is connected to a mass storage controller (not shown) of the system bus 805, to be connected to the CPU 801. The mass storage device 807 and an associated computer readable medium provide non-volatile storage for the server 800. That is, the mass storage device 807 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology used for storing information such as a computer readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing. The system memory 804 and the mass storage device 807 may be collectively referred to as a memory.

According to the embodiments of this application, the server 800 may further be connected to a remote computer on a network through a network, such as Internet. That is, the server 800 may be connected to a network 812 by being connected to a network interface unit 811 on the system bus 805, or, may be connected to a network of another type or a remote computer system (not shown) by using the network interface unit 811.

The memory further includes one or more programs. The one or more programs are stored in the memory and configured to be executed by one or more processors. The one or more programs include an instruction used for performing the foregoing methods.

In an exemplary embodiment, a non-transitory computer readable storage medium including a computer instruction, for example, a memory including a computer instruction, is further provided. The computer instruction may be executed by a processor of a server to complete the steps in the foregoing method embodiments. For example, the non-transitory computer readable storage medium may be a ROM, a RAM, a CD-ROM, a magnetic tape, a floppy disk, and an optical data storage device.

In an exemplary embodiment, a computer program product is provided. When the computer program product is executed, the computer program product is configured to implement functions of the steps in the foregoing method embodiments.

It should be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

The sequence numbers of the embodiments of this application are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A sample selection method, applied to a server and comprising:

by the server, selecting n sample pairs from an unlabeled sample set, each sample pair comprising two samples, each sample comprising data in p modalities, n being a positive integer, and p being an integer greater than 1;

calculating a partial similarity between data that is in each modality and that is of one sample comprised in each of the n sample pairs and data that is in each modality and that is of the other sample, to obtain p×p partial similarities;

calculating, according to the p×p partial similarities, an overall similarity between the two samples comprised in the sample pair;

obtaining a degree of difference between the p×p partial similarities and the overall similarity; and selecting a training sample from a sample pair that meets a preset condition and that is in the n sample pairs, the preset condition satisfying that the degree of difference is greater than a first threshold and the overall similarity is less than a second threshold.

2. The method according to claim 1, wherein the selecting a training sample from a sample pair that meets a preset condition and that is in the n sample pairs comprises:

calculating, according to the overall similarity and the degree of difference that correspond to each of the n sample pairs, an information amount corresponding to the sample pair; and selecting, from the n sample pairs, a sample pair whose information amount is greater than a third threshold as the training sample.

3. The method according to claim 2, wherein the calculating a partial similarity between data that is in each modality and that is of one sample comprised in each of the n sample pairs and data that is in each modality and that is of the other sample, to obtain p×p partial similarities comprises:

extracting a feature from data that is in each modality and that is of each sample comprised in each of the n sample pairs; and calculating the p×p partial similarities according to a feature of the data that is in each modality and that is of one sample comprised in the sample pair and a feature of the data that is in each modality and that is of the other sample.

4. The method according to claim 2, wherein after the selecting a training sample from a sample pair that meets a preset condition and that is in the n sample pairs, the method further comprises:
  obtaining a correlation corresponding to the training sample that is labeled by a labeling personnel, the correlation being used for indicating whether two samples comprised in the training sample are correlated;
  adding the training sample to a training sample set; and
  training a metric model by using the training sample set, the metric model being used for measuring a correlation between two objects, and each object comprising data in at least one modality.

5. The method according to claim 1, wherein the calculating a partial similarity between data that is in each modality and that is of one sample comprised in each of the n sample pairs and data that is in each modality and that is of the other sample, to obtain p×p partial similarities comprises:
  extracting a feature from data that is in each modality and that is of each sample comprised in each of the n sample pairs; and
  calculating the p×p partial similarities according to a feature of the data that is in each modality and that is of one sample comprised in the sample pair and a feature of the data that is in each modality and that is of the other sample.

6. The method according to claim 1, wherein after the selecting a training sample from a sample pair that meets a preset condition and that is in the n sample pairs, the method further comprises:
  obtaining a correlation corresponding to the training sample that is labeled by a labeling personnel, the correlation being used for indicating whether two samples comprised in the training sample are correlated;
  adding the training sample to a training sample set; and
  training a metric model by using the training sample set, the metric model being used for measuring a correlation between two objects, and each object comprising data in at least one modality.

7. The method according to claim 6, wherein the training a metric model by using the training sample set comprises:
  initializing the metric model;
  optimizing an objective function corresponding to the metric model by using the training sample set, to obtain an optimized objective function;
  determining, according to the optimized objective function, an augmented matrix corresponding to the metric model;
  performing singular value decomposition on the augmented matrix corresponding to the metric model, to obtain a singular value decomposition result;
  updating the metric model according to the singular value decomposition result, to obtain an updated metric model;
  determining whether the updated metric model reaches a preset training stopping condition; and
  performing the method again from the step of optimizing an objective function corresponding to the metric model by using the training sample set, to obtain an optimized objective function, if the updated metric model does not reach the preset training stopping condition; or
  ending the method if the updated metric model already reaches the preset training stopping condition.

8. A server, comprising a processor and a memory, the memory storing a computer program, the computer program being loaded and executed by the processor to implement the sample selection method according to claim 1.

9. A sample selection apparatus, applied to a server and comprising:
  a selection module, configured to select n sample pairs from an unlabeled sample set, each sample pair comprising two samples, each sample comprising data in p modalities, n being a positive integer, and p being an integer greater than 1;
  a first calculation module, configured to calculate a partial similarity between data that is in each modality and that is of one sample comprised in each of the n sample pairs and data that is in each modality and that is of the other sample, to obtain p×p partial similarities;
  a second calculation module, configured to calculate, according to the p×p partial similarities, an overall similarity between the two samples comprised in the sample pair; and
  a third calculation module, configured to obtain a degree of difference between the p×p partial similarities and the overall similarity;
  wherein the selection module is further configured to select a training sample from a sample pair that meets a preset condition and that is in the n sample pairs, the preset condition satisfying that the degree of difference is greater than a first threshold and the overall similarity is less than a second threshold.

10. The apparatus according to claim 9, wherein the selection module comprises:
  a first calculation unit, configured to calculate, according to the overall similarity and the degree of difference that correspond to each of the n sample pairs, an information amount corresponding to the sample pair; and
  a selection unit, configured to select, from the n sample pairs, a sample pair whose information amount is greater than a third threshold as the training sample.

11. The apparatus according to claim 10, wherein the first calculation module comprises:
  an extraction unit, configured to extract a feature from data that is in each modality and that is of each sample comprised in each of the n sample pairs; and
  a second calculation unit, configured to calculate the p×p partial similarities according to a feature of the data that is in each modality and that is of one sample comprised in the sample pair and a feature of the data that is in each modality and that is of the other sample.

12. The apparatus according to claim 11, wherein the apparatus further comprises:
  an obtaining module, configured to obtain a correlation corresponding to the training sample that is labeled by a labeling personnel, the correlation being used for indicating whether two samples comprised in the training sample are correlated;
  an addition module, configured to add the training sample to a training sample set; and
  a training module, configured to train a metric model by using the training sample set, the metric model being used for measuring a correlation between two objects, and each object comprising data in at least one modality.

13. The apparatus according to claim 9, wherein the first calculation module comprises:

an extraction unit, configured to extract a feature from data that is in each modality and that is of each sample comprised in each of the n sample pairs; and a calculation unit, configured to calculate the p×p partial similarities according to a feature of the data that is in each modality and that is of one sample comprised in the sample pair and a feature of the data that is in each modality and that is of the other sample.

14. The apparatus according to claim 9, wherein the apparatus further comprises:

an obtaining module, configured to obtain a correlation corresponding to the training sample that is labeled by a labeling personnel, the correlation being used for indicating whether two samples comprised in the training sample are correlated;

an addition module, configured to add the training sample to a training sample set; and a training module, configured to train a metric model by using the training sample set, the metric model being used for measuring a correlation between two objects, and each object comprising data in at least one modality.

15. The apparatus according to claim 14, wherein the training module comprises:

an initialization unit, configured to initialize the metric model;

an optimization unit, configured to optimize an objective function corresponding to the metric model by using the training sample set, to obtain an optimized objective function;

a determining unit, configured to determine, according to the optimized objective function, an augmented matrix corresponding to the metric model;

a decomposition unit, configured to perform singular value decomposition on the augmented matrix corresponding to the metric model, to obtain a singular value decomposition result;

an update unit, configured to update the metric model according to the singular value decomposition result, to obtain an updated metric model;

a judging unit, configured to:

determine whether the updated metric model reaches a preset training stopping condition, and initiate repetition of steps from optimizing an objective function corresponding to the metric model by using the training sample set, to obtain an optimized objective function, if the updated metric model does not reach the preset training stopping condition; or end operation if the updated metric model already reaches the preset training stopping condition.

16. A non-transitory computer readable storage medium, storing a computer program, the computer program being loaded and executed by a processor to implement a sample selection method comprising steps of:

selecting n sample pairs from an unlabeled sample set, each sample pair comprising two samples, each sample comprising data in p modalities, n being a positive integer, and p being an integer greater than 1;

calculating a partial similarity between data that is in each modality and that is of one sample comprised in each of the n sample pairs and data that is in each modality and that is of the other sample, to obtain p×p partial similarities;

calculating, according to the p×p partial similarities, an overall similarity between the two samples comprised in the sample pair;

obtaining a degree of difference between the p×p partial similarities and the overall similarity; and selecting a training sample from a sample pair that meets a preset condition and that is in the n sample pairs, the preset condition satisfying that the degree of difference is greater than a first threshold and the overall similarity is less than a second threshold.

17. The non-transitory computer readable storage medium of claim 16 wherein selecting a training sample from a sample pair that meets a preset condition and that is in the n sample pairs comprises:

calculating, according to the overall similarity and the degree of difference that correspond to each of the n sample pairs, an information amount corresponding to the sample pair; and selecting, from the n sample pairs, a sample pair whose information amount is greater than a third threshold as the training sample.

18. The non-transitory computer readable storage medium of claim 16 wherein calculating a partial similarity between data that is in each modality and that is of one sample comprised in each of the n sample pairs and data that is in each modality and that is of the other sample, to obtain p×p partial similarities comprises:

extracting a feature from data that is in each modality and that is of each sample comprised in each of the n sample pairs; and calculating the p×p partial similarities according to a feature of the data that is in each modality and that is of one sample comprised in the sample pair and a feature of the data that is in each modality and that is of the other sample.

19. The non-transitory computer readable storage medium of claim 16 wherein after the selecting a training sample from a sample pair that meets a preset condition and that is in the n sample pairs, the method further comprises:

obtaining a correlation corresponding to the training sample that is labeled by a labeling personnel, the correlation being used for indicating whether two samples comprised in the training sample are correlated;

adding the training sample to a training sample set; and training a metric model by using the training sample set, the metric model being used for measuring a correlation between two objects, and each object comprising data in at least one modality.

20. The non-transitory computer readable storage medium of claim 19 wherein the training a metric model by using the training sample set comprises:

initializing the metric model;

optimizing an objective function corresponding to the metric model by using the training sample set, to obtain an optimized objective function;

determining, according to the optimized objective function, an augmented matrix corresponding to the metric model;

performing singular value decomposition on the augmented matrix corresponding to the metric model, to obtain a singular value decomposition result;

updating the metric model according to the singular value decomposition result, to obtain an updated metric model;

determining whether the updated metric model reaches a preset training stopping condition; and repeating steps again from the step of optimizing an objective function corresponding to the metric model by using the training sample set, to obtain an optimized objective function, if the updated metric model does not reach the preset training stopping condition; or ending if the updated metric model already reaches the preset training stopping condition.

* * * * *